US 9,015,175 B2

(12) United States Patent
Gill et al.

(10) Patent No.: US 9,015,175 B2
(45) Date of Patent: Apr. 21, 2015

(54) METHOD AND SYSTEM FOR FILTERING AN INFORMATION RESOURCE DISPLAYED WITH AN ELECTRONIC DEVICE

(76) Inventors: Timothy David Gill, Maplewood, NJ (US); Eric J. Hoffer, Maplewood, NJ (US)

( * ) Notice: Subject to any disclaimer, the term of this patent is extended or adjusted under 35 U.S.C. 154(b) by 102 days.

(21) Appl. No.: 13/096,779

(22) Filed: Apr. 28, 2011

(65) Prior Publication Data

US 2011/0270876 A1   Nov. 3, 2011

Related U.S. Application Data

(60) Provisional application No. 61/330,341, filed on May 1, 2010.

(51) Int. Cl.
  *G06F 17/00* (2006.01)
  *G06F 17/30* (2006.01)

(52) U.S. Cl.
  CPC ............................. *G06F 17/30634* (2013.01)

(58) Field of Classification Search
  CPC ............. G06F 17/30696; G06F 17/30864; G06F 17/2775; G06F 17/30731; G06F 17/30997; G06F 17/274; G06F 17/2785; G06F 17/3089; G06F 21/554; G06F 17/212; G06F 17/218
  See application file for complete search history.

(56) References Cited

U.S. PATENT DOCUMENTS

| | | | |
|---|---|---|---|
| 5,692,173 A | 11/1997 | Chew | |
| 6,862,713 B1 | 3/2005 | Kraft et al. | |
| 7,340,686 B2 | 3/2008 | Matthews | |
| 7,383,503 B2 | 6/2008 | Banks | |
| 7,487,145 B1 | 2/2009 | Gibbs | |
| 7,526,425 B2 * | 4/2009 | Marchisio et al. | 704/9 |
| 7,571,391 B2 | 8/2009 | Roessler | |
| 7,668,816 B2 | 2/2010 | Morgan et al. | |
| 7,673,235 B2 | 3/2010 | Bailey et al. | |
| 7,747,598 B2 * | 6/2010 | Buron et al. | 707/705 |
| 7,836,044 B2 | 11/2010 | Kamvar et al. | |
| 2004/0003403 A1 | 1/2004 | Marsh | |
| 2004/0032432 A1 | 2/2004 | Baynger | |
| 2006/0095845 A1 | 5/2006 | Van Leeuwen | |
| 2007/0061487 A1 * | 3/2007 | Moore et al. | 709/246 |
| 2007/0106658 A1 * | 5/2007 | Ferrari et al. | 707/5 |
| 2007/0198495 A1 * | 8/2007 | Buron et al. | 707/3 |
| 2007/0203903 A1 * | 8/2007 | Attaran Rezaei et al. | 707/5 |
| 2008/0040325 A1 | 2/2008 | Sachs et al. | |
| 2008/0172622 A1 * | 7/2008 | Roche et al. | 715/762 |

(Continued)

OTHER PUBLICATIONS

IEEE Standard 1003.1 (2004 Edition), The Single UNIX Specifications, 2004, Piscataway, NJ.

*Primary Examiner* — Angelica Ruiz

(57) ABSTRACT

A system and method for filtering an already obtained information resource ("document") for display is described, including identifying a target portion of the information resource; dividing the data of the target portion into elements of a set; receiving one or more search requests as a filter specification; interpreting the filter specification as a Boolean logic expression; evaluating the elements of the set based on the Boolean logic expression, in an ongoing manner, each time the filter specification is entered or modified; and dynamically re-rendering the display, upon each such entry or modification of the filter specification, with all elements not matching the logic expression removed from the display of the target portion, providing the user with a "shrinking document" more likely to contain just the information being looked for.

17 Claims, 10 Drawing Sheets

(56) References Cited

U.S. PATENT DOCUMENTS

| | | |
|---|---|---|
| 2009/0055771 A1 | 2/2009 | Nurmi |
| 2009/0182738 A1* | 7/2009 | Marchisio et al. ............... 707/5 |
| 2010/0166309 A1* | 7/2010 | Hull et al. .................... 382/176 |
| 2010/0189765 A1 | 7/2010 | Erickson et al. |
| 2010/0228752 A1* | 9/2010 | Folting et al. ................. 707/758 |
| 2011/0153599 A1* | 6/2011 | Hillis et al. ................... 707/723 |
| 2011/0185273 A1* | 7/2011 | Dacosta et al. ............... 715/234 |
| 2012/0158752 A1 | 6/2012 | Chakka |

* cited by examiner

METHOD AND SYSTEM FOR FILTERING AN INFORMATION RESOURCE DISPLAYED WITH AN ELECTRONIC DEVICE

CROSS REFERENCE TO RELATED APPLICATION

The application claims the benefit of U.S. Provisional Application No. 61/330,341, filed May 1, 2010, which is incorporated by reference herein in its entirety.

FIELD OF INVENTION

The present invention is related to a system and method for filtering information.

BACKGROUND OF THE INVENTION

Information is displayed almost everywhere, such as on computer monitors, smart phones, electronic kiosks, televisions, or e-book readers—at work, at home, and in public and commercial spaces. More information is available more quickly than in the past at least because of the Internet, the World Wide Web, and the mass use of electronic devices and their connectivity and portability, all of which makes for a severe and worsening situation of information overload. Despite the abundance of information available, a user often cannot quickly find just the information they want. The software and interfaces currently available which control how information is displayed and navigated are often not very helpful or as simple as the user would prefer, and the screens often display too much information for the users to digest, and their experience of finding information is often not satisfying.

Often, when people "search" for information, they attempt to do something beyond simply seeking the list of web pages or documents that relate to a particular topic (i.e., what has become synonymous with the term "search" over the last decade). They are often looking to apply some filtering to the retrieved material so that they can find and make use of the portions of the material that relate to their need or which might answer their question. Web search tools are often only part, albeit a very powerful and important part, of the solution to the overall objective of finding information.

Electronically displayed information can take many forms: documents, web pages, books, spreadsheets, lists, directories, inventories, manuals, glossaries, catalogs, FAQs, help systems, indices, tables of contents, online newspapers, blogs, user comments on online content, database search results, channel listings for a television, or content within a software application's windows, to name a few. If the displayed information is dense, or more specifically, partially "off the screen" so that the user has to use a keyboard, mouse, finger swipe, remote control, voice command or other mechanism to bring additional parts of the information into view, the user often has difficulty in finding the exact information desired. There is often too much information available to the eyes, either immediately or within a fraction of a second and therefore visual scanning, scroll bar manipulation, a basic Find command, keyboard PageUp and PageDown keys, or finger swipes are often insufficient for finding "just" the information desired. With the variety of mechanisms one currently has available for use, with various interfaces, people often get overwhelmed when they simply want to find a small amount of information.

Inadequacies may exist at the low end of the range of sizes of "starting points" in the overall process of finding information. Web and enterprise search solutions often look for relevant information resources from among millions or billions of web-based resources, and databases often provide search solutions for resources having thousands or millions of "records". The inadequacies are often noticeable in the later steps of such web search interactions, for example, when a user wishes to find information within a single information resource (document, web page, list, index, etc.) that the user is looking at, wherein there are commonly hundreds or thousands of information elements from which the user is interested in finding a small subset.

From the point of view of the information provider, it can be difficult to determine what users are looking for or at within a resource. Therefore it can be difficult for the provider to interactively expose the most appropriate options or additional information.

There are many web and enterprise search engines which address the large scale information finding objective, locating documents (individual information resources) that may indeed have the information a user wants. But this type of "search" is often inadequate for the user's needs, and finding the needed information within the retrieved information resource (document, web page, directory, glossary, etc) is usually left either to each individual information provider to address (or ignore) as they see fit, or to the browser, document viewer, or other software tool used to display the information.

Widespread tools such as word processors and web browsers provide limited capability with their Find commands, typically allowing the user to search for a single text string, perhaps also highlighting all instances on the page. Such Find commands have various limitations. For example, they typically do not allow finding paragraphs, sentences, or list items that have both word1 and word2 or either word1 or word2, etc.

The search capabilities provided within information resources themselves are often restricted in that they may only be used on the resource for which they have been provided. For example, the search mechanism for bookmarks in a web browser usually can search for bookmarks in that browser but not files within a directory.

A widespread practice among people experienced with working with data involves making copies of information from one form and putting it into another form that has better filtering capabilities. For example, many data jockeys will extract data from web pages or other documents and insert it into a spreadsheet. Getting it into a suitable form within the spreadsheet may take considerable effort with cut-and-paste techniques, formulas, functions, and hand editing. Once the data is in a usable form in the spreadsheet, the user may take advantage of the native capability of the spreadsheet for filtering and sorting.

The search capabilities provided in many of the application-specific contexts do not provide complete Boolean logic capability or the ability to search for phrases. For example, one browser bookmark search (for example, the Firefox™ browser) provides the ability to do an AND operation using a blank as the implied operator, but not an OR, a NOT or a quoted string capability. Other browsers provide no ability to use any of the Boolean operators or a phrase search. So, if the user has, for example, several thousand bookmarks, searching with these restrictions is usually insufficient to produce the best results for the information need. Similarly, a popular spreadsheet allows only a limited number of OR operations (using a cumbersome menu interface) for filtering the spreadsheet data.

Some web pages that allow users to search for product information provide a faceted search approach that allows the user to mark in a check box various attributes of the product in a number of categories (e.g., price, size, feature, and manufacturer). Implicitly, these approaches usually restrict the search to a series of Boolean AND operations of the selected facets; sometimes a Boolean OR is available; only rarely is a Boolean NOT function allowed. In addition, the provider of the information resource may not have included facets for the specific attributes by which the user may wish to filter the resource.

Summing up some of the above inadequacies, because of the variety of mechanisms and interfaces in use, and their disparity and inadequacies, users typically do not have a simple, comprehensive, consistent method to find information within individual information resources that are too large to be easily navigated or show fully on a single electronic display.

Some solutions for the issue of the provider displaying related content, such as AdSense, are utilized to attempt to contextualize based on interpreted meaning of the content on a page. Such systems make use of natural language processing and sophisticated algorithms to glean the "sense" of what a page's content is about. Unfortunately, unless these systems are used in conjunction with eyeball and mouse tracking software, they are typically unable to determine which portion of content within a given screen has captured the user's attention, which words the user is focused on in their effort to locate what they are seeking.

Accordingly, it is desirable to provide an improved system and method for filtering information that overcomes drawbacks and inadequacies of known methods and systems.

SUMMARY OF THE INVENTIONS

Generally speaking, in accordance with the invention, a method for filtering information may comprise identifying a target portion of a data source, dividing the target portion into one or more elements of a set, receiving one or more search requests as a filter specification, interpreting the filter specification as a Boolean logic expression, evaluating the set elements based on the expression, and displaying the elements which match the search request on a display.

An embodiment of the invention is directed toward accessing data from a data source, the data being presented on a display, identifying a target portion within said data source, identifying one or more sets of data within said target portion, dividing the sets of data into one or more elements, wherein each element includes one or more searchable components. The method may also include receiving one or more search characters of a filter specification, for example, via an input mechanism, interpreting the filter specification as a Boolean logic expression, and evaluating the expression against the elements and determining if any searchable components match the filter specification. If any components match, the corresponding elements may be marked in memory and displayed. The elements that do not include any components that match the filter specification are preferably excluded from being displayed.

Another embodiment of the invention is directed toward a filtering system having a data source for providing data, a user interface module for accessing the data, a rendering module for viewing the data, an input portion of the input and processor module for receiving one or more search characters, and a processor portion of the input and processor module for dividing the data into one or more elements, interpreting the search characters of the filter specification as a Boolean logic expression, evaluating the expression against the elements, and identifying the elements which match the filter specification. The processor portion of the input and processor module may also be responsible for determining what is presented on the display. Preferably, after filtering, the rendering module displays the elements which match the filter specification and not the elements that do not match the filter specification.

Still other objects and advantages of the invention will in part be obvious and will in part be apparent from the specification and accompanying drawings.

BRIEF DESCRIPTION OF THE DRAWINGS

For a fuller understanding of the invention, reference is made to the following description taken in connection with the accompanying drawing, in which.

DETAILED DESCRIPTION OF THE PREFERRED EMBODIMENTS

Certain exemplary embodiments of the present invention will now be described with reference to the drawings. In general, such embodiments relate to a system and method for filtering information, more specifically for filtering information on an electronic display.

Generally, an embodiment of the invention is directed to a method and system for locating information within an identified information resource and either displaying or re-rendering the display to show the information that was located within the information resource. For example, in accordance with an embodiment of the invention, the system may scan information displayed on an electronic screen, including information not visible to the user unless the user scrolls down the page, and segregate portions of information thereon and designate one or more sets of information, each set having one or more elements thereof. The system may provide an interface, for example, a search box, wherein a user may enter one or more search terms. The system preferably searches for the terms within one or more sets, more preferably based on a Boolean logic expression, and displays the elements of the sets of information fulfilling the search request. Preferably, the elements of the sets that do not fulfill the search request are not displayed.

Accordingly, an embodiment of the invention may let the user see the information sought (if there are multiple items within the information resources) proximate each other on the screen by displaying only the elements that fulfill the search request and not the elements that do not fulfill the search request that may be irrelevant to the user. This is in contrast to methods currently available, which typically display all the information on the display with the search terms highlighted and require the user to scroll or otherwise move around in the resource in order to compare the items found to one another (e.g., when trying to compare definitions in a glossary or particular rows of data in a table). Accordingly, the embodiment of the invention may improve the user's navigation of the information compared to such Find commands currently available, which typically make the user's visual attention span gaps of irrelevant information as the cursor moves to each instance of a search string found as the display scrolls through all of the potentially massive amount of information without any indication other than the scroll bar of how far the screen has moved over the information.

Generally, a filtering system and method in accordance with an embodiment of the invention is distinguished from solutions generally thought of as "search" in that the embodiment of the invention is focused upon finding information within an identified information resource, as opposed to locating the information resources that might contain the information being sought.

Figure 1:
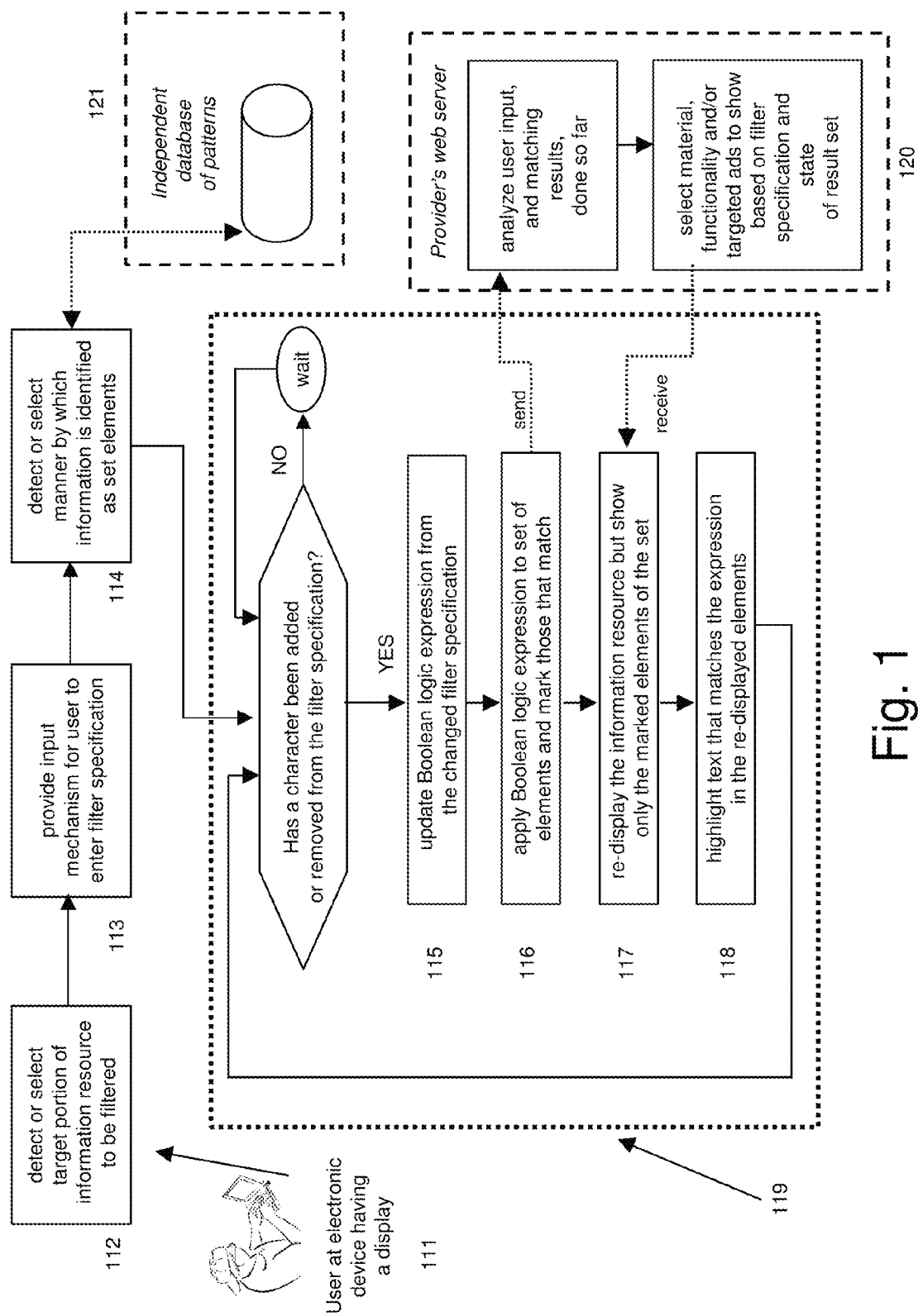
FIG. 1 is a flow chart representing a process in accordance with an embodiment of the invention.

Reference is made to FIG. 1, wherein an embodiment of the invention is illustrated. As shown, in step 111, a user accesses an information resource via an interface on an electronic device or a screen of an electronic device. Electronic device may include, by way of non-limiting example, a computer, a television, a kiosk, a portable electronic device such as a smart phone, a portable gaming device, iPad™, Galaxy Tab™, Motorola® Xoom™ and other tablet devices, and an electronic reader such as a Kindle™ and Nook™. The filtering system and method may be available on the electronic device, for example, via an overlay, or integrated within the browser or information resource itself.

The amount of information available for the user may be greater than what can be visibly displayed on the physical screen, thus requiring the user to use a mouse, scroll bar on the interface, keyboard, finger swipe, remote control, voice instruction, application command or other mechanism or method to bring other parts of the available information onto the physical screen and into the user's view.

Identify Target Portion

In step 112 as shown, the target portion of the information resource that is to be filtered is identified. The system may automatically detect the target portion, for example, by scanning the information resource and locating the target portion upon which to run the search. The detection may be performed automatically upon loading the information resource onto the electronic device, for example, upon loading a web page onto a computer screen. Alternatively, the user may specify the target portion using any suitable user interface mechanism, for example, by selecting or highlighting the target portion. To the extent that the resource exceeds the size of the display screen, the system may allow the selection of the targeted portion to include the entirety of the resource, even when the other parts of the resource might be visually inaccessible without required user action.

Identify Elements of Sets within the Target Portion

In step 114 as shown, the manner in which the target portion of the information resource is to be separated into discrete parts is identified. The target portion is preferably separated into one or more sets each having one or more discrete parts, each discrete part comprising an element or member of a set, including its attributes or metadata. Namely, the filtering system preferably considers, or evaluates, any information resource upon which it operates and subdivides it into set elements (often also referred to as records in the context of a database, or rows in the context of a spreadsheet) and attributes or metadata (also referred to as fields or columns, respectively).

Such subdivided consideration or granularity is referred herein as "set-ness". An embodiment of the invention preferably applies or extrapolates a division into elements of a set (and in some cases into attributes as well) regardless of whether the native representation or presentation of such information resource contains or reflects any such subdivision itself, or whether or not the provider of such information resource intended it to be considered as such. This division may be performed automatically based on structural awareness that it is equipped to detect or recognize, for example, from a database of patterns 121 that is independent of the resource, and may do so automatically upon loading the information resource onto the electronic device, for example, upon loading a web page onto a computer screen. The user may perform or assist in this process of specifying the pattern desired for division of the target portion into elements and their attributes, for example, using any suitable user interface mechanism to select or highlight the divisions for such.

Preferably, all the displayed information, including textual, graphic, and/or video, of the target portion of the information resource is encompassed in its entirety within the one or more sets with all of its elements/members and associated attributes and/or metadata. By way of non-limiting example, for a target portion that is a table, its discrete parts may include the rows of the table as members of a set. For example, row 1 may be element 1, row 2 may be element 2, and so forth, with respect to the set.

Some information may already exist in forms that are easy to imagine as sets (e.g., tables, lists, text spreadsheets, and the fields in a file of database records). However, certain embodiments of the invention treat other information that are not typically seen as sets, such as paragraphs of text, as sets of information on which searches can be run. By taking this approach, certain embodiments of the invention render the information not typically considered as a set, just as searchable and filterable as those commonly viewed as sets.

For example, in accordance with an embodiment of the invention, an electronic document, user guide, or help file may contain sections, paragraphs, and sentences, and each of those and their associated contents may be viewed as elements of a set, allowing improved filtering to be used on them, instead of being limited only to scrolling, clicking, expanding, etc. Similarly, directories, FAQs, and inventories are other examples of information resources whose contents may be searched more easily if treated as sets in accordance with an embodiment of the invention. In accordance with certain embodiments of the invention, these information sources are treated as sets having elements thereof, thereby allowing the use of a consistent and powerful interface to simply and dynamically filter the set down to the subset of information needed using Boolean logic operations or other suitable search or filtering operations and dynamic re-display of the positive results.

Receive Filter Specification

Referring to the embodiment illustrated in FIG. 1, in step 113, the system provides the user with a mechanism to input a filter specification, which in the subsequent loop steps 119 is interpreted as a Boolean logic expression that is evaluated against the set identified from the resource. It is to be understood that the filter specification may be input by another entity, by way of non-limiting example, the provider or another entity connected to the information resource or electronic device. The filter specification may be received via an input mechanism, such as a text box, a voice input mechanism, a touch activated mechanism, or other mechanism, as a matter of application-specific design choice.

In accordance with an embodiment of the method, the input mechanism may be a "blank slate", such as a text box. Accordingly, the need to operate numerous drop-downs, click on buttons, or select from among various facet navigation options is preferably removed. Such direct input of words and click reduction may enhance efficiency and facilitate operation by an average non-technical user while being powerful enough for a professional searcher. Additionally, providing a "blank slate" input mechanism may be less restrictive for the user than having to locate and select from choices provided within the functionality of the information resource.

Certain embodiments of the invention may provide advantages over systems which pre-identify and provide facets or categories with which users might filter a list, for example, by 1) not restricting users to pre- or systematically-determined facets (thus considered virtual faceting); and 2) allowing free form notation in the text box and the flexibility to use a combination of Boolean operators wherein users are not restricted. The invention preferably allows, more preferably facilitates or enables, more free-form thought and interaction with the user to seek by words and combinations of words that which the provider of such information resource may not have thought of or considered valuable enough to directly enable.

In accordance with another embodiment of the invention, the input mechanism may include an auto fill mechanism to provide suggested terms based on characters entered into the input mechanism. For example, if the user has entered w-a-t, the auto fill mechanism may temporarily fill in an "er" at the end to auto fill the term "water" until the user either deletes the "e" or enters a different character. Alternatively, a suggestion mechanism may be provided in relation to the input mechanism. By way of non-limiting example, a list of one or more suggested terms, like "water" and "watch" may be provided in a drop box or a row of suggested terms from which the user may select. The auto fill or suggestion mechanisms may select the auto fill or suggested terms from a database of terms or from settings wherein certain string of characters prompt certain auto fill or suggested terms independent of the specific information resource. Alternatively, the auto fill or suggestion mechanisms may use terms within the target portion to provide the auto fill or suggested term. For example, if the target portion has 30 instances of water, 10 instances of watch, and 2 instances of Watkins, the auto fill mechanism may fill in "er" after the user enters w-a-t, or provide suggested terms wherein "water" is the first suggested term, "watch" is second, and "Watkins" is third. Terms that do not appear in the target portion may be excluded from being an auto fill or suggested term, regardless of how popular the term may be otherwise. For example, if the target portion has 10 instances of watch, and 2 instances of Watkins and no instances of water, the auto fill may suggest "watch" and the suggested terms may include "watch" and "Watkins" but not "water". Such a feature may facilitate the user's search.

In accordance with an embodiment of the invention, an activation mechanism, such as an icon or menu item may be provided on the screen of the electronic device to open or activate the input mechanism. This activation mechanism may be provided within the interface wherein the information resource is displayed, such as a web browser, digital book reading program, a spreadsheet, a Word™ document, etc. Alternatively, the activation mechanism and/or the input mechanism may be provided on the interface of the electronic device itself, by way of non-limiting example, the task bar of a computer, a fixed icon on a smart phone. The activation mechanism may also be a physical button or lever, or other activation mechanism on the electronic device itself. Alternatively, the activation mechanism may be a keystroke of the keyboard. The input mechanisms and activation mechanisms may be varied or may comprise a combination as a matter of application-specific design choice without deviating from the scope of the invention. By way of non-limiting example, a computer may have a physical activation lever as well as an activation icon on the task bar; a smart phone or tablet may have an input text box widget on the home screen as well as a voice input button.

Loop Step

Loop step 119 may be repeated as necessary as character sequences are added to or removed from the filter specification, wherein loop step 119 may include steps 115, 116, 117, 118 and 120 as shown. Step 115 preferably includes detecting and interpreting a change in the filter specification and updating the corresponding Boolean logic operations to be performed. Step 116 preferably includes applying the Boolean logic operations to the set of elements in its entirety, and marking in memory those elements (and/or attributes), if any, matching the Boolean logic expression, hereafter referred to as "matched elements".

Display Matched Elements

Step 117 may include re-rendering the information resource to display on the user's electronic device. Preferably, only the matched elements (and/or attributes) are displayed on the electronic device. The part of the information resource outside the targeted portion may be left unchanged, and re-rendered normally by the native rendering functionality, inclusive of the native functionality such as column sorting and hyperlinks, wherever possible. The elements (and/or attributes) that are not "matched elements" are preferably not displayed. In accordance with an embodiment of the invention shown in FIG. 3B and discussed below, an indicator of excluded elements may be provided for the user to appreciate what has been excluded from being displayed.

It may be beneficial to have just the matched elements, and therefore only the information that the user is searching for, being displayed. It may also be beneficial to include in the display those matched elements of the set which are accessed from subsequent pages of the resource. By excluding the elements that do not match the search, the items that the user is searching for can be displayed together rather than being buried in copious amounts of items that are not of interest. Therefore, the information resource may be cut down to a size that can fit on fewer display screens, preferably a single display screen, and reducing, preferably eliminating, the need for scrolling through the display screen or bouncing around within the display screen as individual pieces are located. It may also be beneficial to include in matched elements those elements which link or make reference to resources which contain information, data or metadata that satisfies the filter specification.

Furthermore, displaying only the matched elements may eliminate the need to break up an information resource into separate information resources or multiple pages in an attempt to give the user the impression that there is not too much information to look through. Whether a list of 2000 document titles is broken into 10 web pages of 200 titles each or provided as a single web page of 2000 items, most of the items are not visible to the user regardless of whether they are on an unretrieved web page on a server or just "below" the current screen of the display waiting to be scrolled to. Breaking up such an information resource may be an unnecessary effort on the part of the information provider, and thus possible wasted expense, and an often frustrating experience for the user, with a combination of both scrolling/browsing and link traversal necessary to try to find the information sought. By displaying only the matched elements, the embodiment of the invention may eliminate the need for scrolling through the 2000 titles or the need to click through the 10 pages of titles. Rather, the displayed results may be limited to those which fulfill the user's filter specification, which may significantly reduce the number of titles the user must look through.

Step 120 may include analysis by the provider of the user input and the result set, and the provider preferably exposes content and/or functionality accordingly. Referring to step 118, the text strings that match the user filter specification are preferably highlighted within the remaining displayed information, to facilitate being visible to the user and making clear why those matched elements remain displayed.

As discussed above, steps 115 to 118 and 120 may be repeated as the filter specification changes. Accordingly, the information being displayed on the electronic device may be updated in response to each change in the filter specification.

Dynamic Display

An embodiment of the invention may include dynamic processing and display, wherein consistently, across all filtered information resources, the matched elements are dynamically re-displayed while material that does not correspond to the user's filter specification is excluded, preferably without the need for the user to make use of the ENTER key or other function to initiate the process. More specifically, the user's filter specification may be evaluated as each character (letter, number or other unit input) is added or removed from the search interface. Accordingly, the elements of the target portion that do not fulfill the user's filter specification are preferably removed from the display, and those that do fulfill the user's filter specification are displayed.

By way of non-limiting example, if a user enters a first letter into the input mechanism and a first loop step 119 is performed, a first group of matched elements are marked for inclusion and are displayed. Subsequently, if the user enters a second letter into the input mechanism, a second loop step 119 may be performed, wherein either the entire set of elements or only the first group of matched elements is reevaluated according to the updated Boolean logic operation and a second group of matched elements is identified and displayed, replacing the first group of matched elements. The second group of matched elements may be smaller than the first group of matched elements because of the additional character in the filter specification. Alternatively, if the filter specification is modified such that the subset of elements matching the revised expression could be larger than the first group, for example, by the addition of an OR operator to the filter specification or the removal or modification of a character already in the specification, the entire set of elements is preferably reevaluated in accordance with the updated Boolean logic expression, and the second group of matched elements may be larger than the first group of matched elements.

Therefore, the user may be able to collapse the information resource to just the material being sought, bring together instances from within the material and visually grouping them for further scrutiny or use as the user is entering the filter specification. Without waiting for any server-based activity, without having to use the ENTER key or click on one or more buttons, the user may quickly see the effectiveness and progress of the search, such as seeing how much shrinking of the set a certain AND operation achieves or noticing a typing mistake when the filtered results shrink more than expected or, for example, to none.

Though there are isolated mechanisms for dynamically hiding information which is distracting or unneeded by the user, such as filtering mechanisms within spreadsheet programs or the search tool for the App Store on Apple®'s iPhone®, these mechanisms tend to be very specific (being tied to one type of information or one application) or overly cumbersome (requiring many mouse movements and/or clicks) to use efficiently. The filtering system and method in accordance with an embodiment of the invention preferably overcomes this deficiency. It is to be understood, however, that the dynamic updating feature is not necessary and may be modified or excluded without deviating from the scope of the invention.

Preferably, the appearance of the information resource other than the target portion, or the functionality of any part of the information resource, is not altered. For example, all material surrounding the target portion, and all hyperlinks, capabilities to sort columns, etc., both inside and outside the target portion, preferably still work. The target portion displayed is altered dynamically to show only the parts of it that the user wants to see based on the Boolean logic interpretation of the filter specification.

EXAMPLE 1

To illustrate an embodiment of the invention, an exemplary practice thereof is described and depicted in FIGS. 2A thru 2G. In the example shown, a user utilizing an electronic device having a filtering system and method in accordance with an embodiment of the invention installed thereon as an overlay accesses a long list of U.S. patent classes and their titles on the U.S. Patent and Trademark Office's website via a web browser. The web page on the USPTO site includes a table of classes with some prefatory text and selectable options at the top, and some standard footer text and links common to many web pages on the site at the bottom. The table of classes occupies the vast majority of the information on the web page and requires much scrolling or use of the PageDown key to browse through the list, since there are more than 400 classes shown on the page.

Figure 2A:
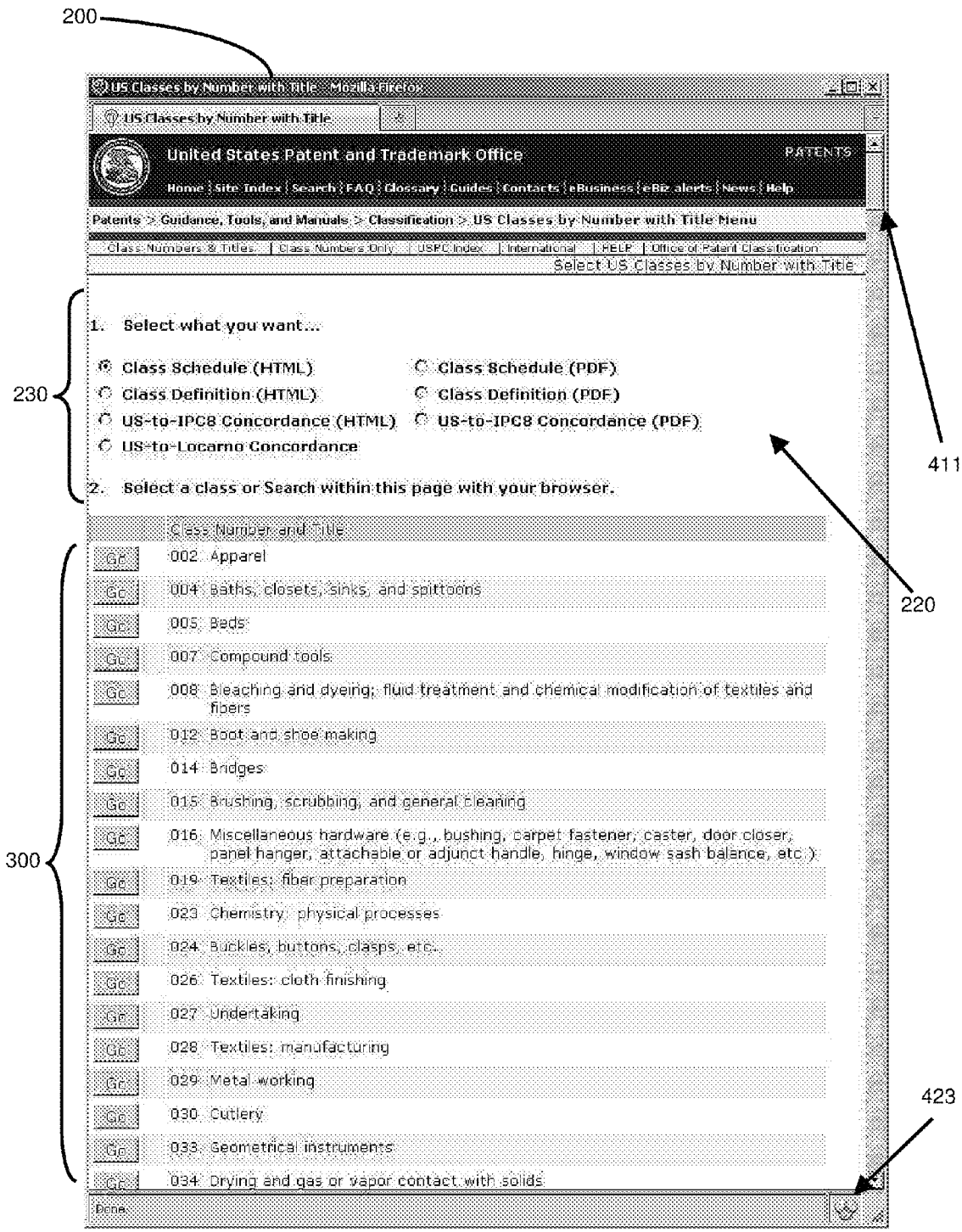
FIG. 2A is a screenshot of a display in a first stage in accordance with an embodiment of the invention.
Figure 2B:
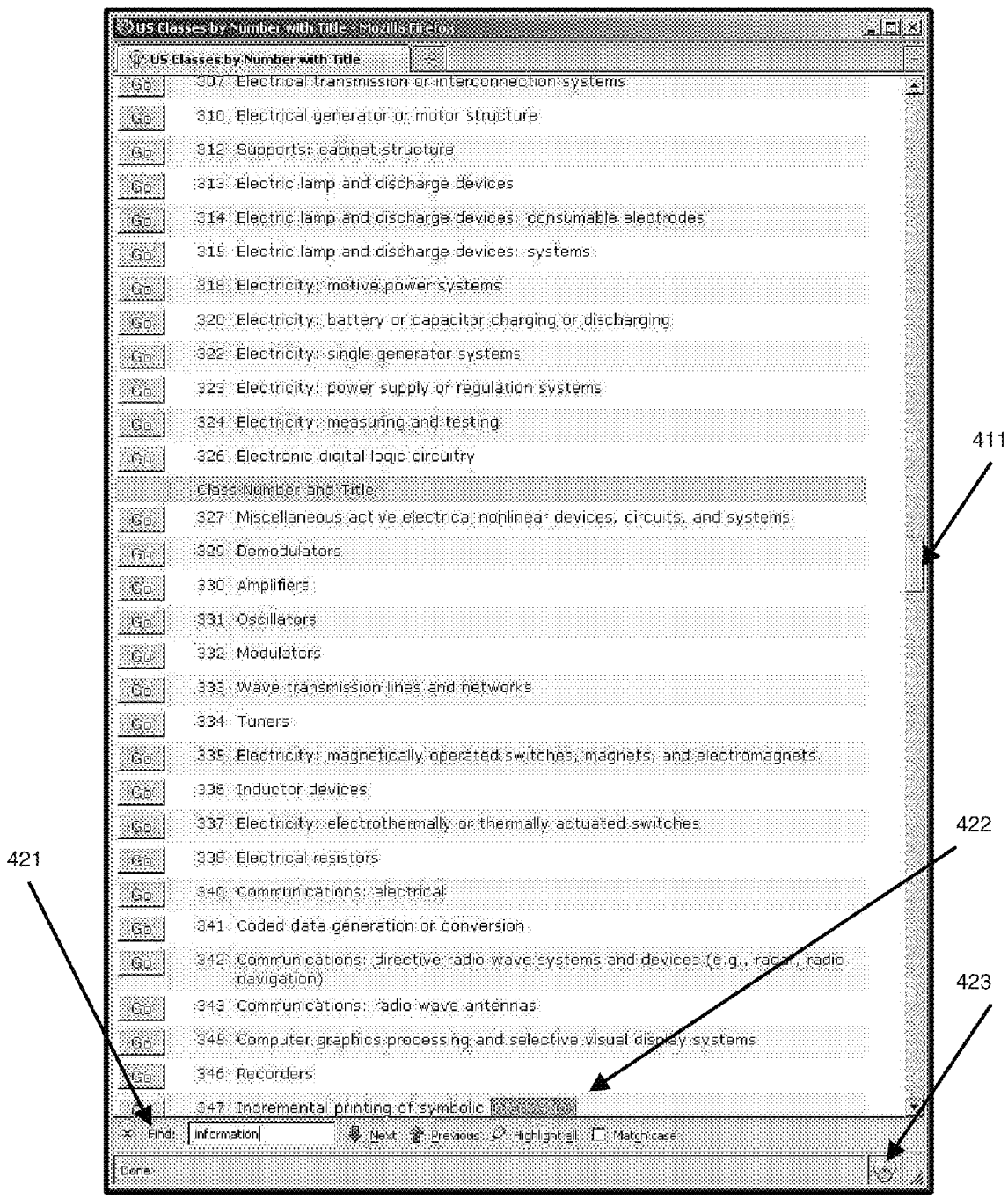
FIG. 2B is a screenshot of the display of FIG. 2A in a second stage.

Referring to FIG. 2A, a display 200 shows an information resource 220 comprising a web page wherein various pieces of information are displayed. As one of ordinary skill in the art would understand, a scroll bar 411 indicates that information resource 220 exceeds the size of display 200, and thus the user should scroll down the page using scroll bar 411, the PageDown key on the keyboard or other mechanism to access the rest of information resource 220 that is not visible in display 200.

The Find command in the browser may be inadequate to locate the small subset of classes in which the user might be interested (e.g., classes that have the words data or information). In the example illustrated in FIG. 2B, the user conducts a web browser Find command to locate classes that include the term "information" in its title by entering "information" into a browser Find box 421. The first instance of "information" on the web page is at class number 347 shown in FIG. 2B and display 200 is revised to show the first instance of "information" referred to herein as 422. Scroll bar 411 indicates that display 200 is showing a portion of the web page halfway down the web page. Typically the user must click "next" or scroll down the webpage to find the other instances of "information." Moreover, the Find command in the browser typically cannot run a search for multiple terms such as "information" or "software".

In the bottom right corner of display 200, an activation mechanism 423 is illustrated as an icon that may be clicked to activate the filtering system and method. It is to be understood that the size, image, location, etc. of activation mechanism may be varied without deviating from the scope of the invention.

Figure 2C:
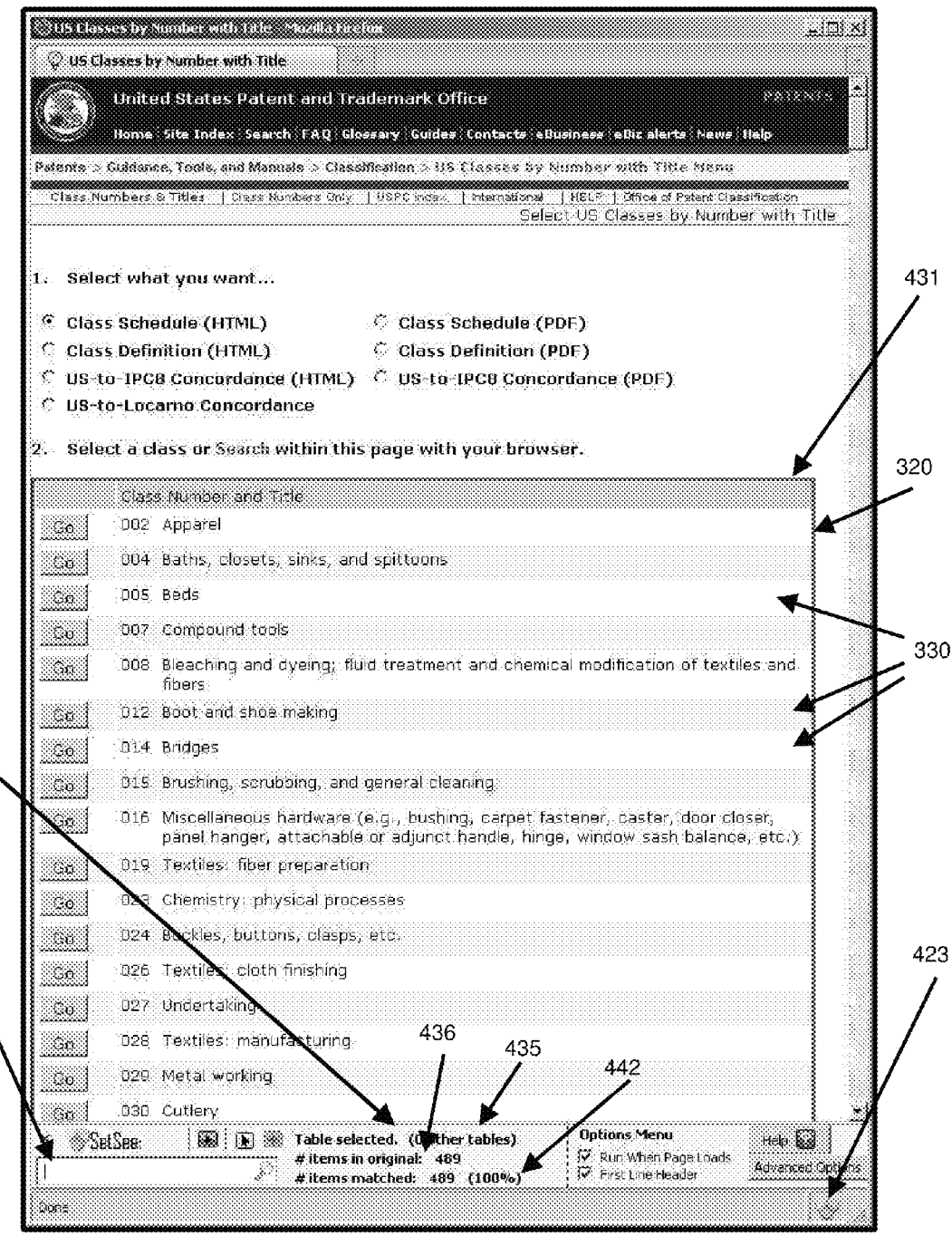
FIG. 2C is a screenshot of the display of FIG. 2A in a third stage.

Reference is made to FIG. 2C, wherein input mechanism 433 was activated and appears in the form of a text box in tool bar 432. In this example as shown, information resource 220 includes a target portion 300 which is identified in accordance with Step 112 of FIG. 1 and an excluded portion 230. The system and method may default to working with the entire web page but provides an option to the user to select, using a suitable user interface mechanism, the portion of the web page on which the method should operate, namely to designate a target portion 300. In the example shown, the system and method can recognize that there is a large table on the page on which the system and method would work, and suggests treating the table as a set 320 (or referred to interchangeably as table 320 herein) to the user by adding a bold box 431 around table 320. It is notable that the bottom of bold box 431 is "off screen", as is the rest of table 320, indicating that more of table 320 remains beyond what is visible.

In the example shown, table 320 is the only table in target portion 300. The user is alerted that a table is selected and that there are no other tables via a table indicator 435 in tool bar 432. If no table is selected, table indicator 435 would say "no table selected." If more tables were available, table indicator 435 would indicate how many other tables are available and the user may select another table to run the search via a table selection button 462 and selecting the desired table, for example, by clicking on the desired table using a mouse. Alternatively, the user may switch from one table to another via a next table button 464.

As shown, target portion 300 includes table 320 having a plurality of elements 330. Table 320 may be identified automatically by the filtering system and method or by the user initiating the identification step 114 via a table detection button 460. The filtering system and method may default to checking target portion 300 of information resource 220 for content recognizable as elements 330 of a set 320, per predefined patterns from an independent database 121 or user-assisted selection from an option menu. Alternatively, it may provide the user an interface to allow the user to identify which part(s) of table 320 should constitute a single member of a set, namely element 330 and attributes thereof. In the example illustrated, the filtering system and method recognizes that information resource 220 contains a single table 320, and builds its set 320 by treating the contents of each row of table 320 as an element.

In this example, the filtering system and method identified the number of rows and made each row an element 330 in its set 320. The data from each row (element 330) of table 320 is maintained in a data structure to allow it to be processed in the subsequent steps. Since all of the table is available to the filtering system and method in the downloaded web page—even though it is not all viewable by the user since without scrolling the display to bring other parts of the web page on the screen—the contents of the entire table can be put into the required data structure. The data structure may be stored in memory, for example, a memory array, of the electronic device, a separate storage on a terminal or a network, a server on the Internet, and so on.

Accordingly, the filtering system and method separates table 320 into elements 330 each comprising a row of table 320 in accordance with step 114. An elements indicator 436 in tool bar 432 indicates the total number of elements 330 in table 320, which is shown to be 489 in the example shown. A matched elements counter 442 indicates the number of matched elements matching the filter specification. In FIG. 2C, because nothing was entered into input mechanism 433, the number of matched elements equals the total number of elements.

Figure 2D:
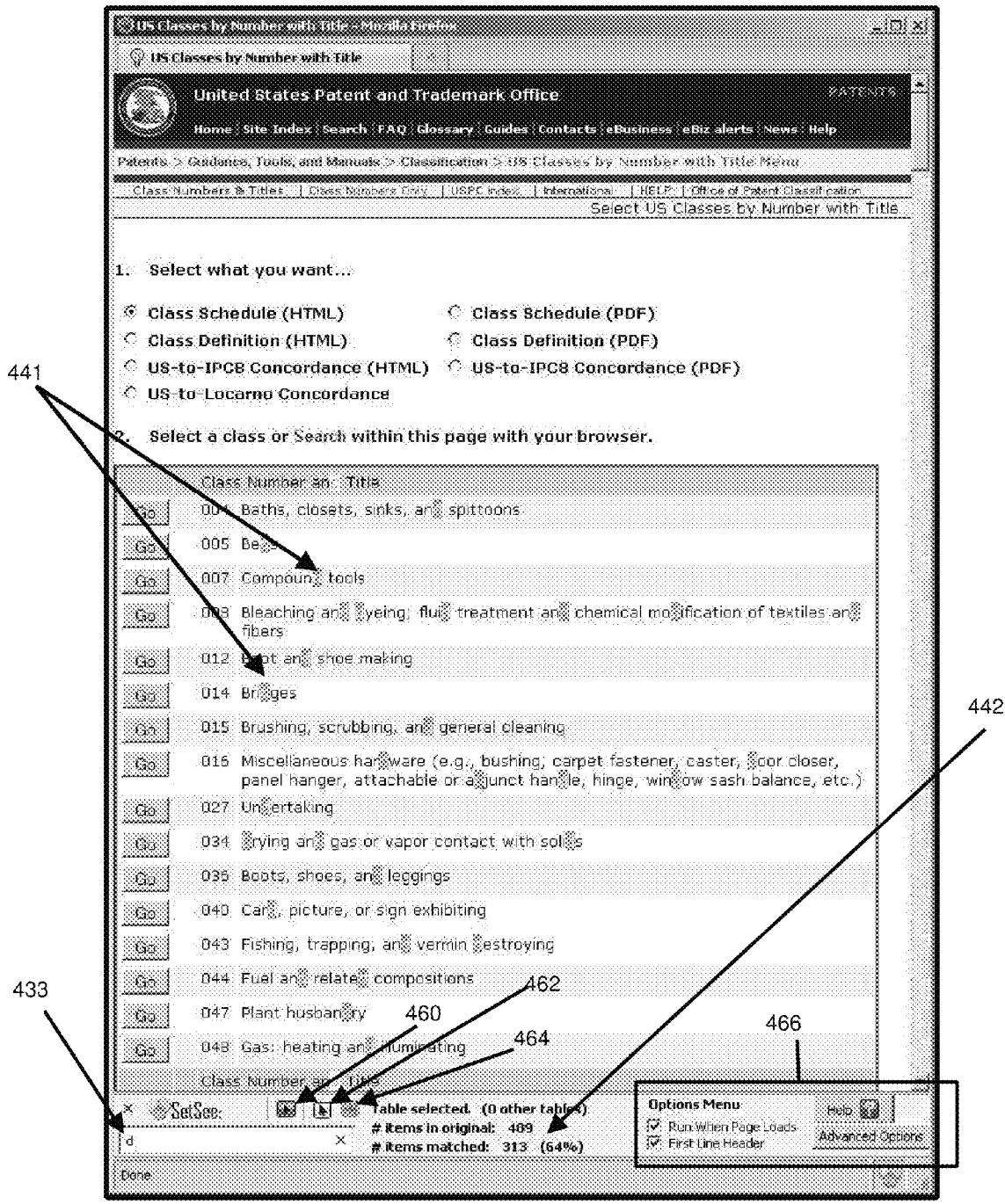
FIG. 2D is a screenshot of the display of FIG. 2A in a fourth stage.

FIG. 2D illustrates display 200 after the letter d is entered into input mechanism 433. As shown, not all of the elements 330 from FIG. 2C are displayed within bold box 431 in FIG. 2D. Rather, all elements 330 in bold box 431 in FIG. 2D include the letter d in accordance with the filter specification modified by entering d into input mechanism 433 and elements 330 that do not have the letter d are removed from being visible on display 200. Each of the elements 330 displayed is a matched element 441 identified in furtherance of step 116 wherein the Boolean logic expression based on the filter specification received via input mechanism 433 was applied to all elements 330 of the set, table 320.

More specifically, once the letter d was entered into input mechanism 433 and thus into the filter specification, the Boolean logic expression was updated accordingly in furtherance of step 115, and elements 330 of set 320 were evaluated accordingly to identify elements 330 that matched the Boolean logic expression and marked such elements 330 accordingly as matched elements 441 in furtherance of step 116. In other words, the updated Boolean logic expression was evaluated against the data structure to mark which elements 330 should be displayed. In furtherance of step 117, only matched elements 441 are displayed within bold box 431 of display 200. As shown in FIG. 2D, the matched text d of each matched element 441 is highlighted in furtherance of step 118.

Figure 2E:
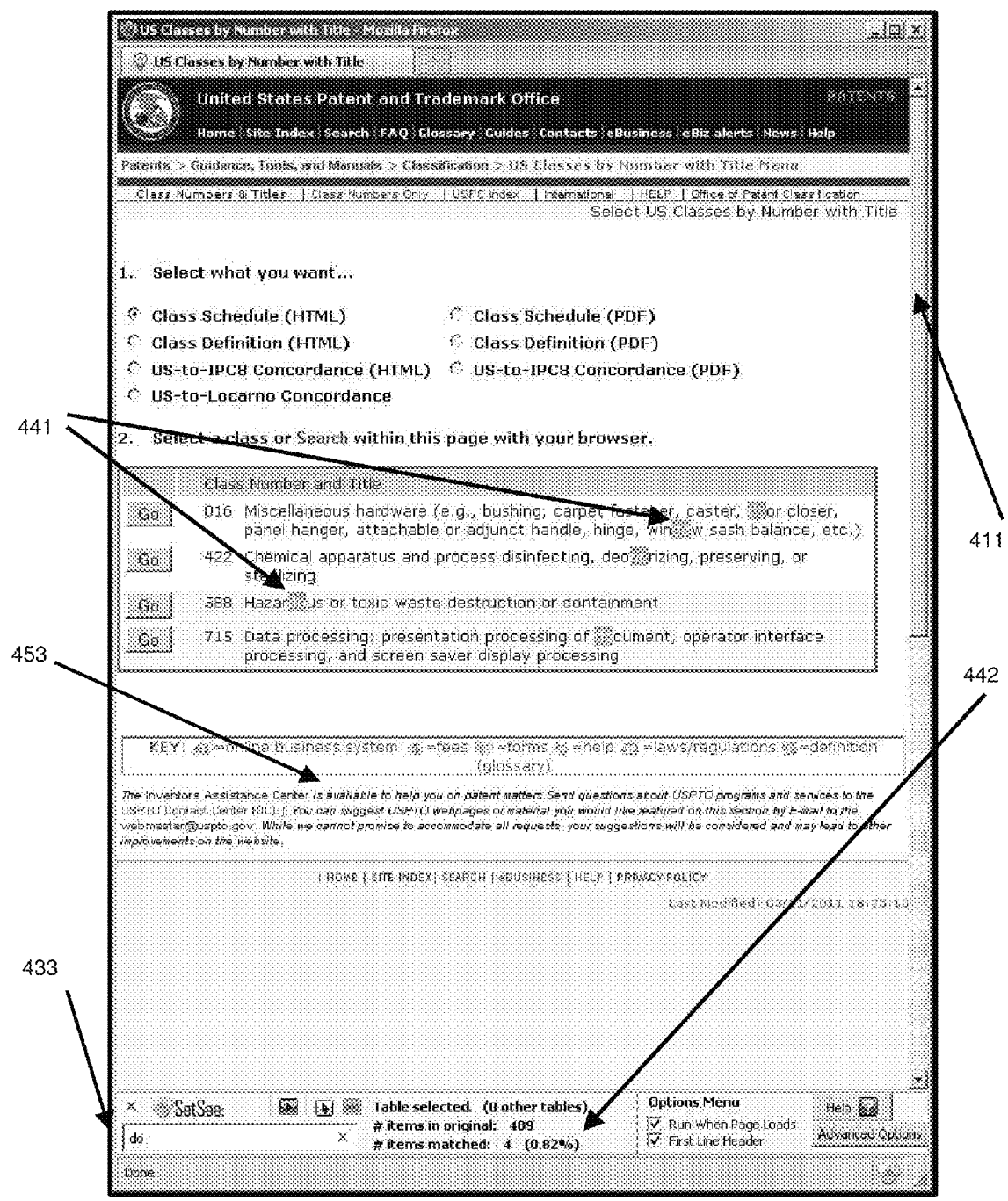
FIG. 2E is a screenshot of the display of FIG. 2A in a fifth stage.

Reference is made to FIG. 2E wherein do is entered in input mechanism 433. Accordingly loop step 119 is performed again, wherein the change in filter specification from the entry of o after d resulted in a modification of the Boolean logic expression and a re-evaluation of set 320 to identify matched elements 441 for the updated filter specification. In other words, the additional character represented by o was obtained and added to a representation of the query string in the data structure. It is to be understood that the backspace/delete key are valid characters removing previously entered characters from the string. The updated filter specification is re-evaluated as a Boolean logic expression according to the Boolean logic syntax that the software being used supports for evaluating what the user enters.

Each member of the data structure containing set 320 of elements 330 is checked to determine if any element 330's contents match the evaluation of the updated Boolean logic expression. Each element 330 in the data structure is marked as to whether or not it is a matched element 441.

As shown, the number of matched elements 442 went from 313 in FIG. 2D to 4 in FIG. 2E. The display was dynamically changed as the user entered the characters into input mechanism 433. Namely, the web page was re-displayed, wherein only elements 330 of table 320 that have been marked in the data structure as matching the filter specification entered thus far, do with regard to FIG. 2E. This loop step 119 is repeated each time a character is entered, altered, or removed from the filter specification.

Figure 2F:
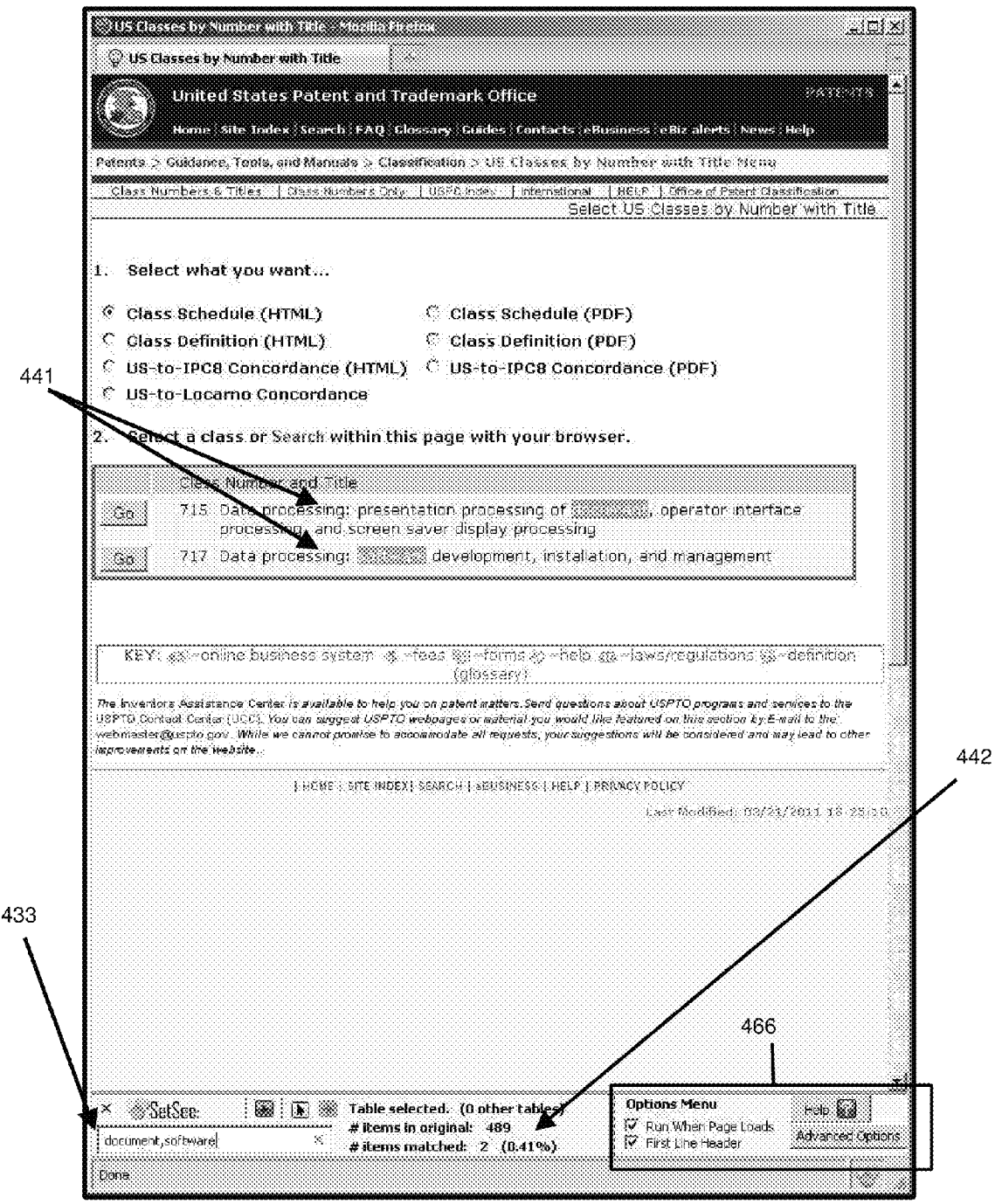
FIG. 2F is a screenshot of the display of FIG. 2A in a sixth stage.

In FIG. 2F, the user had entered document, software into input mechanism 433. The "," represents the OR operator, and accordingly, there are 2 matched elements 441 as shown in bold box 320 and indicated by matched elements counter 442. Matched elements 441 include at least one of the terms "document" or "software" as shown by the highlighted terms within matched elements 441.

Figure 2G:
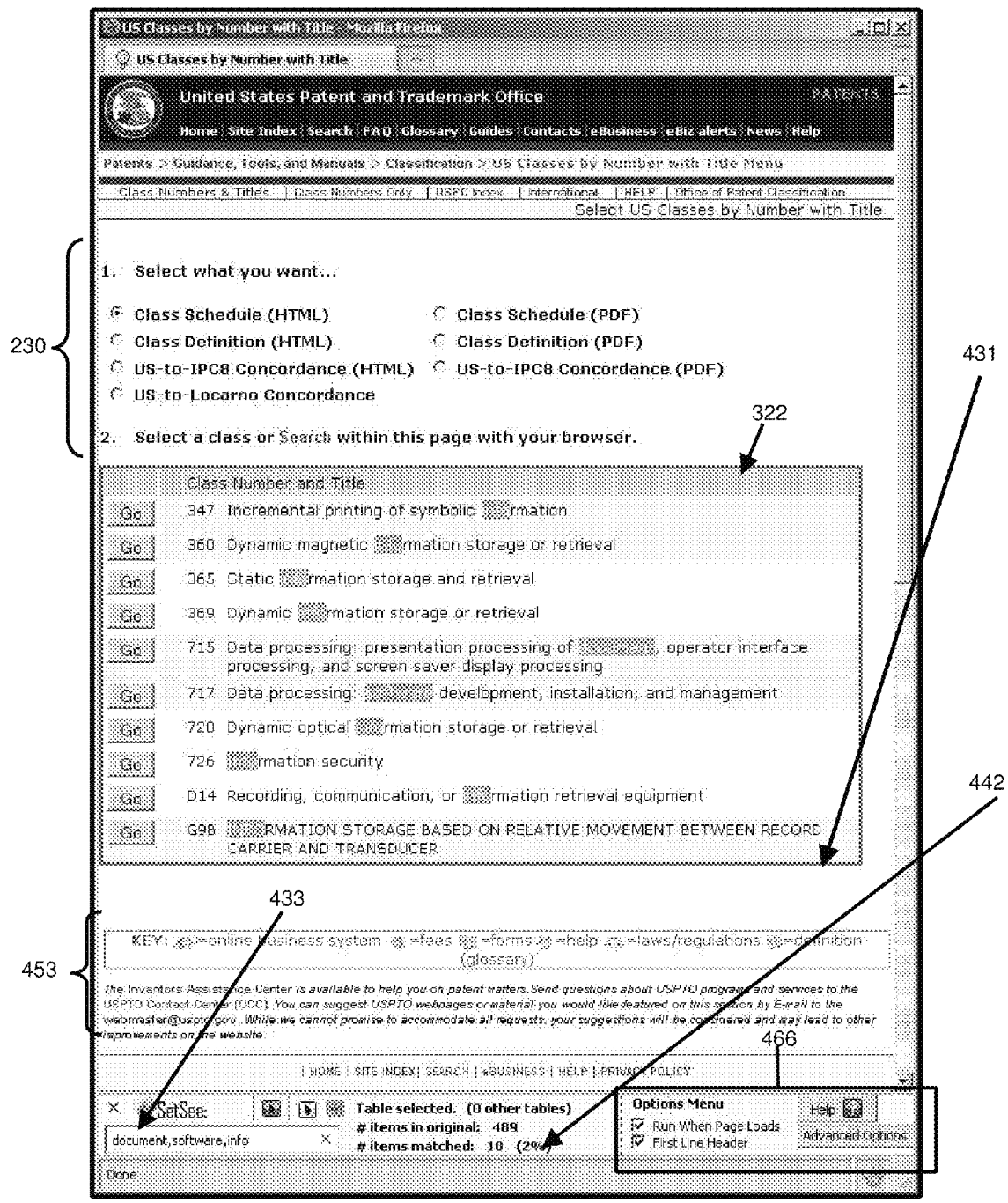
FIG. 2G is a screenshot of the display of FIG. 2A in a seventh stage.

Reference is made to FIG. 2G, wherein document, software, info was entered into input mechanism 433. Accordingly, elements 330 having any of the three terms, "document," "software" or "info" are marked as matched elements 441 and displayed in bold box 431. As shown, table 320 has 10 matched elements 441 as seen in display 200 and indicated by matched elements counter 442.

As loop step 119 is being processed, the size of the displayed table in bold box 431 that the user can see changes dynamically as the user enters text into input mechanism 433, shrinking from its original size. As illustrated, entering a few letters in input mechanism 433 and thus modifying the filter specification, can radically shrink the amount of displayed information quickly. If the portion of the web page being processed (such as the table of classes in this example) is nearly the entire web page, then that reduction may reduce the information displayed to a size small enough to be displayed on a single screen, with no scrolling needed. This may facilitate the user focusing in on the information sought and may expedite the user finding the information sought.

An options menu 466 is also provided on the tool bar 432, wherein option menu 466 in the example illustrated includes options regarding whether or not the filtering system and method runs upon loading the page, as well as whether or not to treat the first line of table 320 as a header 322. If the first line is treated as header 322, header 322 is not included as elements 330 and is excluded from the Boolean logic expression evaluation. Additionally, keeping header 322 in place may help maintain the appearance of table 320 after the search is run. Options menu 466 also includes a help button and an advanced options button which may provide further information and options.

As illustrated in FIGS. 2C to 2G, excluded portions 230 are not affected by the filtering system and method and remain the same; and the bottom part of the web page 453, not previously visible in earlier FIGS., is now visible in FIG. 2E as the table 320 has been reduced to less than 1% of its original size as shown in the matched elements counter 442. Only the contents of table 320, and thus inside bold box 431 are affected. In FIGS. 2E to 2G, because the bold box 431 is small enough, the entire bold box 431, including the bottom thereof, is visible in display 200, indicating that all matched elements 441 are displayed. This is in contrast to FIGS. 2C to 2D, wherein the bottom of bold box 431 was not visible, which indicated that there were more matched elements 441 than those visible in display 200. Accordingly, by entering a short query, the user was able to take a copious list of classes and shorten it into a short list of only the classes that include the terms that the user is interested in.

With software implementing a filtering system and method in accordance with an embodiment of the invention installed as an add-on to the web browser, the user may apply the filtering system and method to various information resources displayed on the screen, using a filter specification typed into an input mechanism 433 in the form of a text box 433, as described in Example 1.

Whereas Example 1 is described herein as having the filtering system and method installed on the user's device as an overlay, it is to be understood that the filtering system and method may be integrated into information resource 220 or even the web browser, so that it is an intrinsic aspect of the capabilities of that web page or browser, such that the user does not have to install any software. Other variations are also contemplated and may be provided as a matter of application-specific design choice without deviating from the scope of the invention.

Additional or alternative elements of this embodiment may include, but are not limited to, the option for selecting multiple tables to be operated upon together. For example, many web pages on Wikipedia™ that have fairly long lists are broken up to be in 26 tables, one for each letter of the alphabet, such as the List of Colors page. The filtering system and method may allow the user to select multiple tables to be operated upon, so that items from different tables (e.g., ash grey, attleship grey, trolley grey, in three different tables, in the example) may be matched by the filtering system and method and included together in the result, while all of the other content on the page, outside of the 26 tables, remain unchanged and retains any functionality within the result, such as sorting.

EXAMPLE 2

Figure 3A:
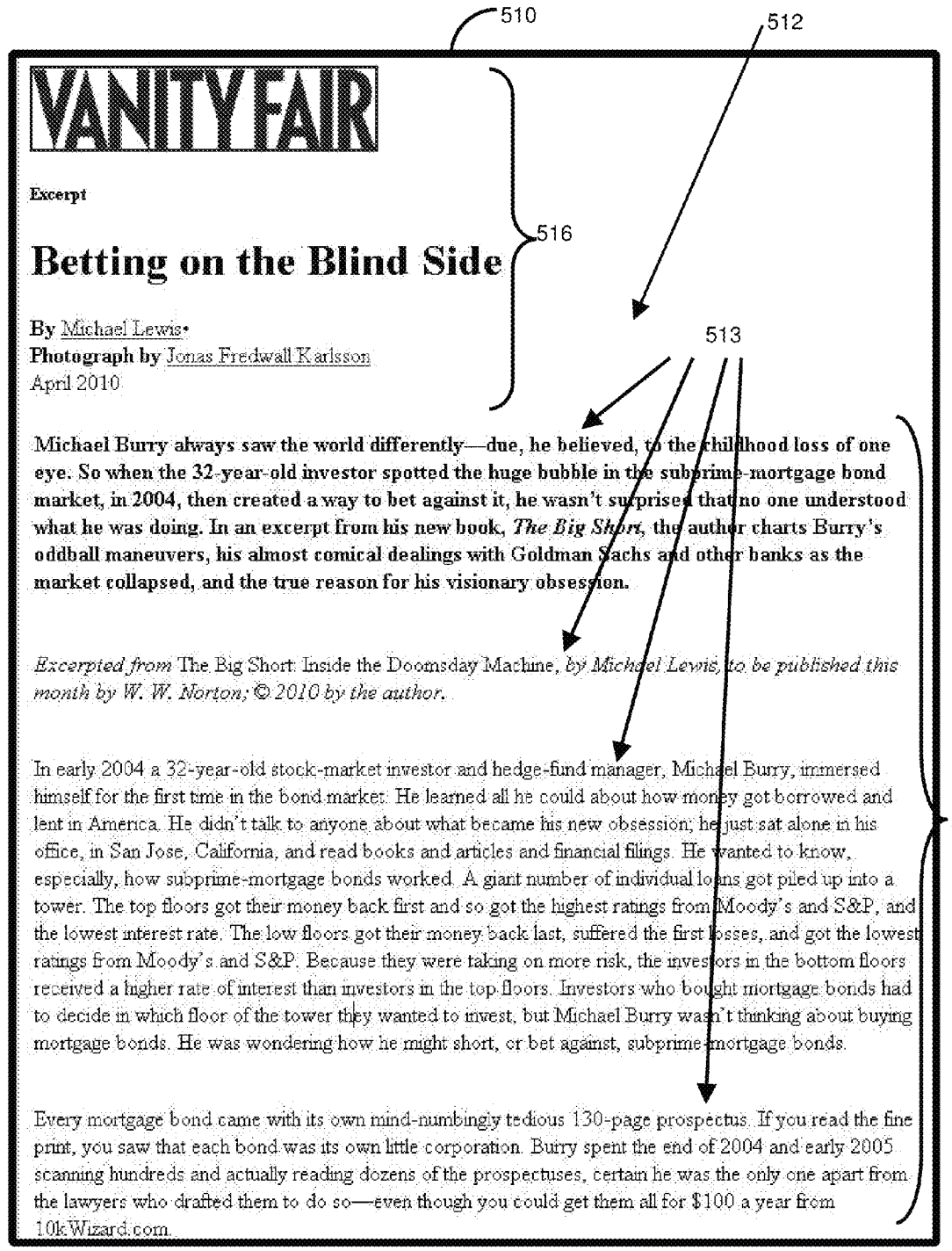
FIG. 3A is a screenshot of a display in a first stage in accordance with an embodiment of the invention.
Figure 3B:
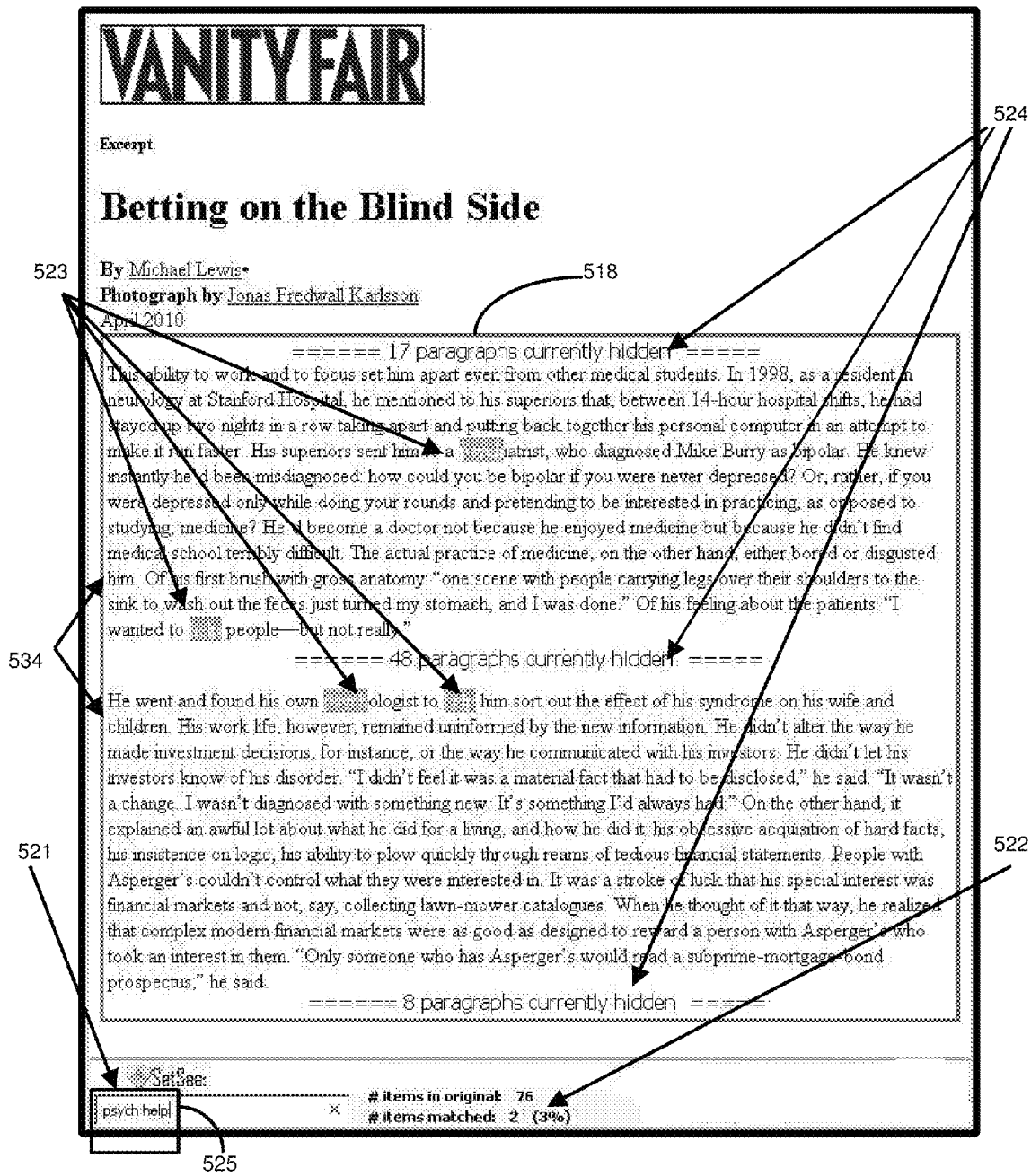
FIG. 3B is a screenshot of the display of FIG. 3A in a second stage.

To illustrate an embodiment of the invention, an exemplary practice thereof is described and depicted in FIGS. 3A thru 3B. In the example shown, an electronic reading device (an "e-reader") having an e-reader display 510 is used to display a long magazine article 512 which is not visible in a single display and requiring scrolling to access the remaining portions of article 512. FIGS. 5A and 5B show two states of e-reader display 510, before and after the filtering system and method is used, to illustrate an embodiment of the invention.

In the example illustrated, the filtering system and method defaults to working with the content of the entire article 512 having a plurality of paragraphs 513 as a target portion of the article in furtherance of step 112, excluding the title, author and other information regarding article 512 and the source of article 512 (such as the magazine title) as excluded portions 516. In accordance with step 114, all paragraphs 513 in article 512 are designated as elements of a set. Therefore, a data structure is populated with the text of each paragraph 513 so that Boolean logic can be applied to the data structure to identify which paragraphs 513 contain text that matches the filter specification entered by the user.

In the example shown, the e-reader allows the user to request, via an activating mechanism such as a physical button on the e-reader itself, that an input mechanism 521 such as a text box appear in which the user may enter a filter specification 525. If the e-reader has a keyboard, either a physical keyboard or a soft keyboard appearing on the screen, the user may enter search terms via typing. Alternatively, if the e-reader has voice input capabilities, the user may enter search terms via speaking. In the example shown, input mechanism 521 is a text box on the bottom portion of e-reader display 510.

The filtering system interprets the entered text of the filter specification, updates the Boolean logic expression, evaluates the expression against the text of the plurality of paragraphs comprising the set of elements maintained in the data structure, modifies the data structure to indicate which elements should be displayed, and refreshes e-reader display 510 to show only one or more matched elements 534 (paragraphs) of the set (article), using loop step 119 described above.

More specifically, the filtering system and method in accordance with an embodiment of the invention obtains a character of text entered into input mechanism (text box) 521 and adds it to a representation of the filter specification in a data structure. Then, the filter specification is re-evaluated as a Boolean logic expression according to the Boolean logic syntax supported by the integrated software for evaluating filter specification 525 the user enters. Then, the filtering system and method scans each member of the data structure containing the set of elements (paragraphs) from article 512 to determine if any of the contents of elements match the evaluation of the Boolean logic expression—i.e., does each paragraph 513 contain words matching the expression interpreted from filtering specification 525, and marks each corresponding element (paragraph) in the data structure as to whether it matches or not. Article 512 is re-displayed, but only paragraphs that have been marked in the data structure as matching the filter specification entered so far. In the example shown, each expanse of undisplayed paragraphs are notated with a hidden elements indicator 524 stating how many paragraph are not displayed. Such an indicator 524 may facilitate the user's reading or understanding of the search result. The entire loop step 119 may be repeated for each character entered by the user.

In the example shown in FIGS. 5A and 5B, a possible scenario is that the user has been reading the article for some time when her attention is interrupted. Upon return, the user is at a paragraph halfway through the article that begins "He went and found a psychologist to help . . . " and wonders, "Haven't I read about a psychologist or psychiatrist earlier in the article?" The user types filter specification 525 psych help (implying a Boolean AND between "psych" and "help") in input mechanism 521 and e-reader re-displays article 512 but only showing paragraphs 513 in which both the words "psych" and "help" appear. A matched elements counter 522 on e-reader display 510 indicates that the filtering system and method found 2 such paragraphs, namely, 2 matched elements (paragraphs) 534. Matched elements 534 are re-displayed in e-reader display 510, each matched element 534 having a plurality of matched terms 523 therein highlighted. Hidden elements indicators 524 inform the reader that a large number of paragraphs have been temporarily removed from e-reader display 510 because they do not match filter specification 525. Therefore, the user may discern that someone getting help from a psychiatrist was mentioned 48 paragraphs earlier in article 512, and may continue to read article 512, feeling more confident of understanding the whole story.

*****

Other embodiments of the invention include, by way of non-limiting example, providing the filtering system and method implemented within an application program that can open and display files of one or more types, where the ability to find information within such files may be enhanced with the functionality. If a word processing application includes the filtering system and method to work with the document files that it supported, such an arrangement may be considered an overlay.

By using an embodiment having an overlay as described, the often cumbersome process of copying data from some information resource into a spreadsheet so as to take advantage of the filtering capabilities in that tool may be eliminated. By providing the capabilities in a tool that can be applied directly to the native form of the information resource, extra steps and effort can be saved.

The filtering system and method in accordance with an embodiment of the invention may be superior to methods currently available and the individual components thereof by providing a combination of capabilities. It is preferably product-, system-, and platform-independent and preferably can act upon the output of other systems and is capable of re-rendering that output within the context of those other systems, superimposing its capabilities over and alongside that of such other systems whose information it works upon, as well as allowing extensions to the capability of the other systems. Existing stores of information, in various formats, can preferably be transformed into a canonical set form that any given embodiment can filter without difficulty.

A filtering system and method in accordance with an embodiment of the invention preferably can work as an added capability without otherwise affecting the original display of the information. More specifically, the embodiment of the invention may use the native display functionality for the information (whether web browser, document editor, file explorer, or other software), so that content such as hyperlinks and images are not altered or affected, and there is no need to copy the information into another tool for filtering.

Unlike some existing solutions provided with various information resources to provide a filtering method for that information resource and that information resource alone, an embodiment of the invention includes an overlay, wherein a search may be conducted within any located and displayed information resource itself. The information resource need not provide its own method of filtering because the overlay can provide the function. Using the same method of this overlay embodiment for a variety of information resources may allow the user to be more effective in their effort at finding the information sought because the user does not have to learn the nuances and user interfaces of different solutions provided by individual information resources, but rather can use the embodiment of the invention for the various information resources.

An embodiment of the filtering system and method of the invention is applicable and usable upon information resources that do not have native filtering functionality, and on a consistent basis across all those information resources to which it is applied. Thus, in addition to being applicable universally, the functionality that the embodiment of the invention brings to such information resources is preferably consistently applied. More specifically, the interface and operation of it, the syntax in use of it, and the interpretation methods underlying it, are preferably consistent across various information resources it may be used upon.

The electronic device may have software or other mechanism installed thereon which implements the filtering system and method in accordance with an embodiment of the invention as an overlay. Accordingly, the user may be able to use the filtering system and method with various information resources regardless, such as articles, television channel line-up, web pages, digital books, store inventories, etc., regardless of whether or not the information resource is local or network-based or on web pages.

Another embodiment of the invention having an overlay is a desktop application that works with arbitrary files located on the user's computer. The application may be capable of reading and displaying files of different file types (e.g., .doc, .xls, .pdf, .odt, txt) and applying the filtering system and method to any of such files based on various methods of breaking the contents into elements of a set.

Preferably, the filtering system and method works with any information resource and does not need to be provided by the supplier of the information. For example, the system may be pre-installed as part of the device or installed by the user on the device. This may be preferred by a user who wants to use it on the information resources of their choosing, rather than being limited to certain types of files or interfaces.

In accordance with another embodiment of the invention, the filtering system and method, in the form of software or other suitable delivery mechanism, is associated with the particular information resource that it will be operating on, enabling the filtering system and method to be applied to only that information resource. Such an embodiment may require the filtering system and method to be provided by the supplier of the information resource. The user does not have to install any software, but also cannot use the method on other information resources. The input mechanism may be provided on the display of the information resource by the information resource provider, rather than being activated by the user via an activation mechanism.

By tying the embodiment of the filtering system and method to a particular information resource that works only on that information resource, the filtering system and method may be tailored and tuned to the particular computing hardware, the exact structure and needs of the information resource, and potentially to be expanded to serve other needs of the information supplier. This may be a powerful way to enhance the user experience of that supplier's customers. Though the user cannot use this system on other information resources, if the system implements the method substantially as described in the first embodiment, the user may benefit from perhaps already knowing how to use the filtering system and method.

One example of this embodiment consists of a personal computer with a web browser, connected to the web, and currently displaying a web page that can be filtered by the user because the method has been implemented by the provider of the information and made available for all users of that specific web page without their needing to install any software on their personal computers. Using the web page example from Example 1 described above, the list of patent classes and titles offered by the USPTO, the USPTO would provide the method in the software controlling the web page. Therefore, the user, in one possible implementation, would see and use a text box at a location determined by the USPTO to enter the filter specification. The filtering system and method would redisplay the web page with only the matching classes in the table displayed. The method would work for all users on that web page, but not on any other information resource (other web pages).

Another embodiment contemplated is a kiosk in a store, such as a retail hardware store, with an attached or on-screen keyboard, for example, that displays the items currently in stock in the store. Such an embodiment may have the filtering system and method either as an overlay or integrated into the information resource. Each item could be described with text, features, photos, location, price, whether it is on sale or not, etc. The filtering system and method may be integrated within the system displaying the information so that any customer could type a few words to quickly find whether the store has a desired item in stock, as well as its location. A variation of this example would permit the customer to wirelessly access the information resource for the store inventory on a portable device, such as their smart phone, tablet device, or similar personal electronic computing device, to find an item at the store using an application supplied for the portable device. This may permit the user to walk around the store as they look for items, rather than being limited to kiosk locations.

In accordance with an embodiment of the invention integrated within an information resource, a potential benefit is enabling feedback to be delivered to the information provider regarding which specific words the user is seeking, allowing those to be analyzed on the provider end as such words are entered, and selecting and displaying or permitting the provider to select and display advertising or other content to the user based on such words. Further, an embodiment of the invention enables passing the state of, and data about, the result-set, to the provider as well, allowing the provider to understand what stage the user may be in their finding activity within the information resource, as represented by the current size of the list or result-set, for example, and to expose relevant functionality 120. Thus, the information resource providers may be empowered to interactively respond to user cues and better position related material and mechanisms.

For example, the information resource provider may wish to expose particular functionality, such as a "buy this item" option when a user has performed filtration of the information resource and reduced its exposed number of records (elements) to one. The method's ability to pass to the provider the "state" of the filtered information resource may enable the provider to do just this. Similarly, sections for "related news", "other items you may like", or targeted advertising may be enhanced by the filtering system and method passing the specific filter specification entered by the user to the provider to let the provider fine tune what is displayed to the user 120.

Moreover, the provider may display advertisements or additional content related to the search terms upon their entry by the user into the filter specification. The provider may also be able to retain a history of searches which the provider may use in determining which advertisements, items of information or order of such items are displayed at the user's subsequent visits to the web page.

The same may apply if an embodiment of the invention were embedded or tied to a web browser or other mechanism for viewing information resources independent of the electronic device. For example, if a web browser such as Firefox™ or Internet Explorer® had an embodiment of the invention having a text box as an input mechanism embedded therein, the filtering system and method may be used on any web page viewed on the web browser, and the web browser may provide advertisements on or proximate the text box, such that as the user enters text into the text box, the user may be shown advertisement related to the filter specification entered either at that time or entered previously during a prior search. The text box may be provided on a banner at the bottom, top or side of the web browser wherein the text box occupies one side of the banner and advertisements may fill the remaining area of the banner. The advertisements may be text, images, hyperlinks, or a combination thereof.

Another example of an integrated embodiment is to have the method implemented within a software application (other than a web browser) that works with and displays information to the user concerning the data that it operates on.

A non-limiting example of a software application having a filtering system and method integrated within may be a personal accounting application that allows a user to create expense categories to be used over time to track household expenses. In the parts of the application that display the list of such categories, the method could be implemented within that window (for example, with a text box at the top of the window) to allow the user to quickly find the subset of categories that the user is interested in, by dynamically shrinking the list of categories as the specification is interpreted as a Boolean logic expression to be evaluated against the list.

Another example of an embodiment of the system and method implemented within software is a file explorer program that allows the user to browse through the file and directory hierarchy of the file system on a personal computer or the like. With personal computers often having tens of thousands of files, any particular directory currently being displayed may have a list of several hundred files. With the filtering system and method incorporated into the file explorer program, every time the user gets to a directory that has too many files listed to easily find the ones of interest, the user may simply enter a filter specification into a search box displayed at the top of the window pane showing the files, allowing the user to zero in on, for example, just the files containing both the text strings "bank" and "Allied" in the file name within the single directory.

In accordance with another embodiment, a program listing on a television, for example, may allow text input from a user using a remote control device, keyboard, smart phone, etc., letting the user find all the nature or science programs showing now or in the near future relatively simply, using the simple filter specification nature, science.

Yet another embodiment of the invention includes the bookmark mechanism referred to earlier. Current bookmarks supported in browsers typically offer a search box, and usually dynamically shrink the list of bookmarks to just those matching the search term entered. However, with the filtering system and method integrated into the browser bookmark search feature, not only could the user employ all 3 Boolean logic operators (AND, OR, NOT) and quotes for phrases to get a smaller and more precise subset of bookmarks then the current art allows, but the user may be able to use exactly the same simple syntax for the filter specification on a web page, in a word processor, on an e-reader, etc.

Certain embodiments of the invention may provide the ability to search on metadata of the elements of the information resource, including columns in tables, as deemed suitable for the search. A mechanism may also be provided to limit the search to a particular attribute (metadata, or "field") of the items being searched. By way of non-limiting example, an embodiment of the invention may limit the search of a particular word to the title of browser bookmarks and exclude the notes the user might have taken on the URL when saving it, a bookmark search refinement which currently is not readily available. Additionally, the common notation of attribute:search-term may work relatively easily with the previously discussed syntax. For example, the search term state:ca in a search of a directory of college alumni may restrict the search on the letters ca to just the part of the element that contains the abbreviation for the state of residence and therefore not erroneously match occurrences of ca in names like Cassandra and Arcadia Drive that might occur in other parts of the element. A mechanism may also be provided to enable the consideration of elements which lie beyond the then visible page of the resource. For example, where a visually paginated resource is the target of filtration, and where the target set may include the elements from its other or subsequent pages, matching elements from those pages may be included in the resultant rendering.

A variation on some of the previous examples allows the native hierarchical structure of the information resource to be part of the targeted and searched resource. For example, a technical document with chapters, sections, and subsections, or a browser bookmark list that lets the user group bookmarks in nested folders, or a sub-tree of a file system on a PC—may have elements (paragraphs, bookmarks, files) that are contained within a hierarchical structure. By including the section headings or folder names within the searched set, the method can allow the user to view the matched items within their original hierarchical context if needed, which may greatly preserve relevant information for the user, and improve their understanding of the result.

Identifying Elements Making Up a Set

Given the very large variety of layouts of both structured and unstructured information represented on a display, it may not be possible to describe in advance all possible ways of dividing an information resource into elements of a set and the attributes of those elements. Additionally, for any given information resource, one user may prefer one way of dividing it (e.g., paragraphs in a novel) while another user may prefer a different one (e.g., sentences in that same novel). For an embodiment wherein the filtering system and method is integrated with the information resource, the provider of the information resource may have decided in advance on how the parts of the information resource make up elements of a set, and the developer of the filtering system and method for that information resource may have special knowledge to perform this step.

Consider, for example, an online newspaper like the New York Times™. The home page of that site is a typically long web page, requiring quite a few scrolling movements for the user to see all parts of the "page". There are probably on the order of several hundred "chunks" of information that, by themselves, could be of interest to a reader and thus could be candidates for being an element of the set (e.g., headlines with the teaser sentences of the article, stand-alone headlines, section titles, the group of top stories in individual sections, etc). The publisher may be in the best position to define what parts of the page constitute members of a set and to know how to remove any non-matching set elements from the display, given the specialized and complex nature of the layout.

The following are non-limiting examples of approaches to performing this set elements identification step for particular types of information. Alternatively, a user may wish to use a different approach, which could be provided in any user interface implementing the filtering system and method.

A table may be a set, wherein each row is an element of the set and the columns represent attributes of such elements.

A document with multiple similar tables may have each row of each table as an element of a single set, in effect joining the tables into a single logical table, again with columns representing attributes of each element thereof.

In a novel or long article, each paragraph may be considered to be the elements of the set, with sentences or words as their attributes. Alternatively, pages, chapters or sentences may be the basis for identifying the set elements.

A glossary may have each term and its definition as an element of the set, or have categories of terms as the elements.

An FAQ of a website may have each question and answer pair, whether a sentence long or several paragraphs long, as an element of a set.

In a photo directory of college students, each student's name, photo, published biographical and contact information collectively may constitute an element of the set.

A long user guide or manual may have each subsection as an element of the set;

A store inventory may have all the information about each product (description, features, photos, the aisle and shelf it is located on, the price, whether it is on sale or not) be an element of the set.

A listing of available TV stations and their current and soon-to-be-broadcast shows in a television listing may have each station and its current/next program as an element of the set.

Within a collection of user comments on a web page, such as an online article or blog post, each comment along with its identifying information (and any of the publication's metadata on the comment) may be considered an element of the set.

For a help file, each leaf node in the typical tree format (including the node's title) may be an element or the set.

In an embodiment of the invention having the filtering system and method available as an overlay, the methods for identifying the elements of a set within a single information resource may be available automatically. However, there may be times when the user wants to employ the user interface mechanism to control how to subdivide a particular information resource for interpretation, filtration and rendering. In an embodiment wherein the filtering system and method is integrated within the information resource, the information publisher is free to choose the manner of interpreting the information as a set.

Boolean Logic

A filtering system and method in accordance with an embodiment of the invention preferably has the advantage of providing full Boolean logic, preferably bringing to the information resources to which it is applied the complete set of 3 Boolean logic operators, and enabling their combination where native capabilities fall short or are entirely absent. In systems currently available that do offer the finding of instances within an information resource, and particularly in non-database type searches, they typically do not allow for finding of entities based on non-contiguous attributes (i.e. the combination of non-adjacent terms, where there is no allowance for finding cases of one word OR another).

It is not necessary to use a filter specification technique that can generate all three Boolean logic operators to act on the information resource. However, a preferred embodiment of the invention provides the ability to perform one or more of the AND, OR, NOT operations of Boolean algebra and the quoted phrase notation, which may make user searches more effective than search methods currently available. The embodiment of the invention may be targeted at the situations when the size of the information resource being searched is in the lower range and not as huge as a web or enterprise search. Providing the OR capability may allow the user to benefit from the power of Boolean union to ensure that variations of the sought for information (e.g., Robin, Robyn to get both spellings of that name, wherein "," represents OR in the search) are in the filtered results. Providing the AND capability may allow the user to benefit from the power of Boolean intersection to significantly reduce the size of the filtered subset (e.g., robotics HCI to ensure that a filtering of 200 computer science faculty in an online directory would show only those professors with research interest in both robotics and human computer interaction). Providing the NOT capability may allow the user to benefit from the power of Boolean exclusion capability to further reduce a found subset by removing matches that are outside of the inquiry (e.g., 8 gb DVDRW –i7 would remove the more expensive i7 computer chip from a possible search of 500 refurbished PCs available on a manufacturer's website).

Syntax for Filter Specification

Users who are not information researchers or trained in computer science may be intimidated by traditional Boolean logic expressions like:

((term1 AND term2) OR (term3 OR term4) NOT term5) OR (term6 AND term7)

By relying upon increasingly common web search conventions, users may quickly learn a simple syntax. For example, a space character means the Boolean AND operator, a minus sign (–) means the Boolean NOT operator, and quotation marks (") mean that multiple words are to be treated as an exact phrase (i.e., a word). A comma (,) may indicate the 3rd Boolean operator, OR, a notation which may be simple, sufficient, and easy to learn. However, it is to be understood that the filtering system and method does not require any particular representation or rules for the filter specification and various alternatives are contemplated and suitable in accordance with the scope of the invention.

With the above mentioned four rules for interpreting the filter specification into a Boolean logic expression, the method may enable a quick and easy syntax to be used to express the filtering desired on the information resource on the user's display. It may also enable some users to specify just what they want without realizing they are using Boolean logic. For example, the filter specification bench,pew oak, maple -carving when applied to an inventory list of used furniture may be easily recognizable, or quickly learned, by most people as equivalent to their saying, "Show me only benches or pews that are made of either oak or maple, but I don't want to see any pieces that have carving". The corresponding Boolean logic expression (bench OR pew) AND (oak OR maple) AND NOT carving may seem too complicated for many people. The traditional Boolean logic syntax may also be used as a filter specification with the filtering system and method, as well as menu interfaces, voice commands, or graphical user interface functions to facilitate construction of such specifications, without deviating from the scope of the invention.

Whereas the examples discussed herein are directed to Boolean logic, it is to be understood that other logic expressions or search mechanisms are contemplated within the scope of the invention.

Memory

In accordance with an embodiment of the invention, each set of a target portion may be designated a memory array of memory units. Data regarding the elements of the set may be stored in each memory unit, preferably in order. For example, in a memory array having units arranged in the order of unit1, unit2, unit3, etc., data regarding element1 may be stored in unit1, data regarding element2 may be stored in unit2, data regarding element3 may be stored in unit3, and so forth. When the Boolean logic expression is applied to the elements, the units containing data that match the Boolean logic expression may be marked "matched." Subsequently, the data within all the units marked "matched" may be retrieved and displayed on the display of the electronic device, thus displaying the "matched elements" in accordance with step 117 described above. It is to be understood that such an arrangement is merely an example of an embodiment, and other arrangements and methods are contemplated without deviating from the scope of the invention.

The examples provided are merely exemplary, as a matter of application-specific design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the order of certain steps, the method of activating the input mechanism, the manner in which the filter specification is entered and received, the types of displays, the types information resources, the types of files searchable, the manner in which the information resources are divided into sets and elements, the location of the input mechanisms, tool bar, icons, buttons, the use of physical or virtual buttons, etc., can be changed without deviating from the scope of the invention as a matter of application-specific design choice. Additionally, other alterations can be made, as a way of non-limiting example, the number of levels of the hierarchy of information, for example, by limiting the target portion to a single set of elements, or by dividing the elements further into sub-elements and sub-divisions thereof, etc. as a matter of application-specific design choice, without deviating from the scope of the invention.

Another variation of the invention may include the use of audio or visual signals in the filter specification. For example, the filter specification may include a string of sound, which may be received and interpreted into an appropriate Boolean logic operation to search for the text represented by the particular string of sound. Alternatively, the string of sound itself may be the sought information, wherein the target portion of the information resource includes one or more sounds, and the marked elements include audio files having the string of sound therein. Or, the system may interpret the string of sound into a representation of notes and mark in memory, for example, elements within a target portion that include sheet music having a portion which corresponds to the string of sound. Accordingly, the system and method, the use, steps, order of steps, etc. may be varied as a matter of application-specific design choice without deviating from the scope of the invention.

It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

We claim:

1. A method for filtering an already obtained information resource, comprising a web page, document, file or other displayable information, for display on a plurality of electronic devices, with third-party functionality relative to a publisher of said information resource, the method comprising:
   a. accessing data of said information resource in memory associated with said device;
   b. detecting one or more parts of said data to operate upon, the collection of said parts comprising a target portion of said information resource as rendered on said electronic device, said detection comprising recognition of repetitive structural patterns, annotations, or manual designation by the user;
   c. identifying, within said data of said target portion, the elements of a set;
   d. identifying one or more searchable components within each said element of said set;
   e. receiving input of a filter specification;
   f. interpreting said filter specification as a Boolean logic expression;
   g. evaluating said elements against said logic expression and identifying those elements which contain components matching said logic expression;
   h. differentiating in memory said identified elements from elements without said matching components; and
   i. updating said target portion to display only said identified elements.

2. The method of claim 1, further comprising detecting said target portion automatically.

3. The method of claim 1, further comprising visually indicating said target portion.

4. The method of claim 1, further comprising receiving one or more characters as input of a filter specification that is capable of expressing, in a text string, the AND, OR, and NOT operators of Boolean algebra.

5. The method of claim 1, further comprising detecting any modification of said filter specification, updating said logic expression, evaluating said elements based on said updated expression, and updating said displayed information in said target portion.

6. The method of claim 1, further comprising leaving unchanged the rendering of displayed information from said information resource that is not within said target portion.

7. The method of claim 1, further comprising displaying responsive information to the user relating to said target portion and to the filtration results, said responsive information comprising metrics regarding said identified elements and said filtration results, an advertisement, a hyperlink, or additional functionality.

8. The method of claim 1, further comprising corresponding with said publisher of said information resource, regarding said filter specification.

9. The method of claim 1, further comprising corresponding with said publisher of said information resource, regarding the filtration results.

10. The method of claim 1, further comprising highlighting parts of said target portion that match parts of said filter specification.

11. A system for filtering information for display, the system comprising:
    a. an obtained information resource, comprising a web page, a document, a file or displayable output of a system or application process, for providing data for display;
    b. a user interface module for presenting said data on a display;
    c. a targeting module, for identifying a target portion of said data to be operated upon, said identification comprising recognition of repetitive structural patterns, annotations, or manual designation by the user;
    d. an input and processor module, with third-party functionality relative to a publisher of said information resource, comprising:
       i. dividing said data of said target portion into elements of a set, in memory;
       ii. receiving input of a filter specification;
       iii. interpreting said filter specification as a Boolean logic expression;
       iv. processing said logic expression against said set of elements; and
       v. identifying and differentiating said elements that match said logic expression from those that do not match said logic expression; and
    e. a rendering module for updating said display by removing and adding elements of said target portion in response to each modification of said filter specification, said modification comprising the entry or removal of characters, or the submission of other computer readable symbols, as said elements are found to match or not match said logic expression.

12. The system of claim 11, further comprising a receiving module for receiving software.

13. The system of claim 11, further comprising a memory module.

14. The system of claim 11, further comprising a detection module for activating said targeting module.

15. The system of claim 11, further comprising an activation module for activating said input and processor module.

16. The system of claim 11, the rendering module further for displaying responsive information to the user relating to said target portion and to the filtration results, said responsive information comprising metrics regarding said identified elements and said filtration results, an advertisement, a hyperlink, or additional functionality.

17. The system of claim 11, further comprising a feedback module for providing said publisher of said information resource with one or more items of information regarding said filter specification and regarding the results of the processing of said input and processor module.

* * * * *